United States Patent [19]
Greene et al.

[11] 3,717,027
[45] Feb. 20, 1973

[54] DIGITAL DISPLAY DISTANCE LOG
[75] Inventors: Walter J. Greene, Reading; Robert R. Perron, Beverly, both of Mass.
[73] Assignee: The Eastern Company, Naugatuck, Conn.
[22] Filed: June 9, 1971
[21] Appl. No.: 151,378

[52] U.S. Cl. ................................................. 73/181
[51] Int. Cl. ............................................. G01c 21/10
[58] Field of Search........73/181, 183, 184, 185, 186, 73/187

[56] References Cited
UNITED STATES PATENTS
3,604,260   9/1971   Ogg.........................................73/181

*Primary Examiner*—Donald O. Woodiel
*Attorney*—Eckhoff, Hoppe, Slick, Mitchell and Anderson

[57] ABSTRACT

A distance log having a digital readout is provided wherein an electronic speed sensor actuates a voltage controlled oscillator so that the frequency of the oscillator output is proportional to speed; the distance traveled is obtained by accumulating the output pulses over a period of time and displaying the sum.

6 Claims, 3 Drawing Figures

INVENTORS
WALTER J. GREENE
ROBERT R. PERRON

INVENTORS
WALTER J. GREENE
ROBERT R. PERRON

DIGITAL DISPLAY DISTANCE LOG

SUMMARY OF THE INVENTION

The device of the present invention is designed to operate with an electric speed sensor wherein there is a definite relationship between speed and voltage. In the particular sensor which was used, a voltage of 5 represents zero speed and 10 volts corresponds with speed of 12 knots. However, it will be understood that this is merely descriptive of one particular device and that the device is usable with sensors having other output voltages.

The D.C. input voltage that is proportional to speed is converted to electrical impulses whose frequency is proportional to speed. The distance traveled is obtained by accumulating (totalizing) these pulses over time and displaying the sum.

The heart of the distance log is a voltage-to-frequency converter. The principal difficulty in designing a voltage-to-frequency converter is that most electrical circuits, where a frequency is voltage dependent, have a non-linear relationship between the input voltage and the output frequency. The output frequency can be made a linear function of voltage by using a feedback technique in accordance with the present invention. To accomplish this two converters are used. The first is the non-linear voltage to frequency converter. The second is a linear frequency-to-voltage converter. The frequency output of the first converter is fed to the second converter and changed to a D.C. voltage similar to the input from the speed sensor. This D.C. voltage is applied to a second input in such a manner as to nearly cancel the effect of the input from the speed sensor. This cancelling return signal is called negative feedback and the overall effect on the system is to make the D.C. input voltage to output frequency a linear conversion.

Once this linear conversion to frequency is accomplished, digital counters are used to divide the frequency down to the pulse rate required by the digital display system. The display system counter continuously accumulates the pulses and displays the sum in decades and 4 decades are used for purposes of illustration. This sum represents the nautical miles traveled. By proper selection of the operating frequency and conversion factors in the electronics, the first decade of display represents tenths of a nautical mile and the remaining 3 decades are units, tens and hundreds of miles.

The overall linear voltage-to-frequency conversion changes the 5 to 10V input to a pulse train of zero to 1,364 pulses per second. The pulse train is divided by 40,960 in 12 stages of digital counters. At this paint the output frequency corresponds directly to nautical miles traveled where one pulse corresponds to one-tenth of a nautical mile. The following Table shows the correspondence between selected speeds, input voltage, frequency and miles:

| speed in knots | input voltage | Converter output frequency PPS | divider output frequency PPS | divider output period (seconds per pulse) | nautical miles |
|---|---|---|---|---|---|
| 0 | 5 | 0 | 0 | inf. | |
| 0.01 | 5.004 | 1.136 | .0002773 | 3600 | .01 |
| .1 | 5.041 | 11.36 | .002773 | 360 | .1 |
| 1 | 5.416 | 113.6 | .02773 | 36 | 1.0 |
| 10 | 9.166 | 1136 | .2773 | 3.6 | 10 |
| 12 | 10.000 | 1364 | .333 | 3.0 | 12 |

The reason for the particular selection of frequencies becomes apparent when the system constraints are considered. Given that a 5V input spread corresponds to a 12-knot range of speed and that one pulse on the input to the display counter represents one-tenth of a mile, the conversion sensitivity is prescribed. The 12-stage divider, providing a division of 40,960, is used to allow the converter to operate at an easy-to-handle pulse rate. Ultimately, this could be removed although some alternate uses for the converter may make it desirable to retain the divider. It is obvious that these particular numbers are illustrative of one particular practical embodiment of the invention and that other values might be used without departing from the spirit of this invention.

DESCRIPTION OF THE PREFERRED EMBODIMENTS

Figure 1:
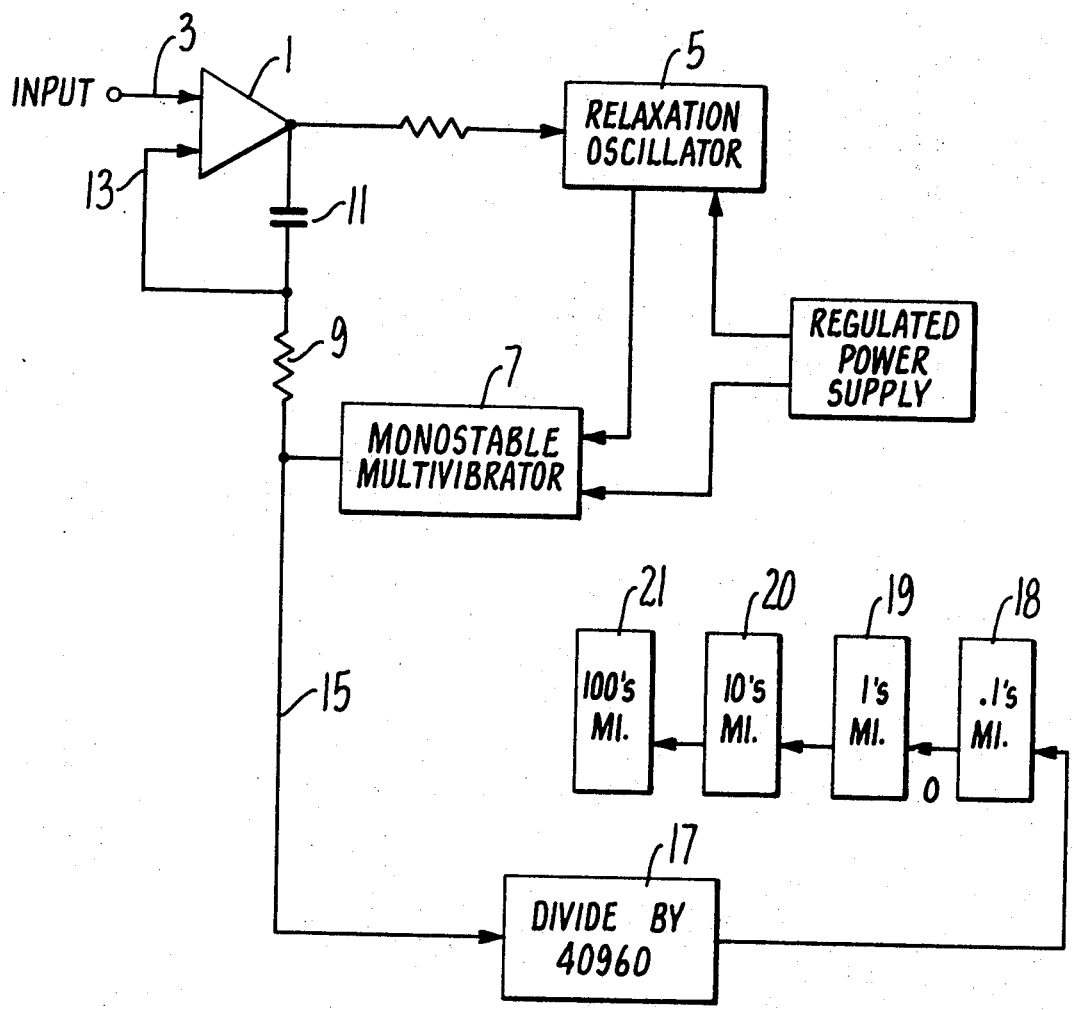
FIG. 1 is a block diagram illustrating the basic principle of operation.

Referring first to the block diagram of FIG. 1, the input from a speed sensor is fed into operational amplifier 1 through line 3. The operational amplifier is a two-port input device and the signal is amplified to a usable value and fed to a voltage controlled oscillator, which may be a relaxation oscillator 5, which converts the voltage to a series or sawtooth waves. The sawtooth wave is fed to a monostable multivibrator 7 and a portion of the output from the monostable multivibrator, which is in the form of a series of square wave pulses, is integrated by resistor 9 and capacitor 11 and fed back to the operational amplifier through inverting port 13. Thus, amplifier 1 acts as a differential amplifier and only the difference voltage between ports 3 and 13 is amplified. As is explained in more detail later, this feedback circuit insures that the square wave output pulse frequency of the monostable multivibrator 7 is directly proportional to the input voltage fed in through line 3.

A portion of the signal from the multivibrator 7 is now passed through line 15 to a series of dividers 17 wherein it is divided by 40960. With the particular components chosen, one pulse from divider 17 represents a distance of 0.1 nautical miles. The signal is then fed through a plurality of decade display devices 18, 19, 20, and 21. The first display device 18 represents tenths of a mile and each pulse registers as a unit on this display device. When the count reaches 10 a carryover pulse reaches display device 19 so that device 19 reads in miles. The same carryover is provided to counters 20 and 21 so that the complete display device displays the mileage traveled in tenths of a mile up to its capacity of 999.9 nautical miles.

Figure 3:
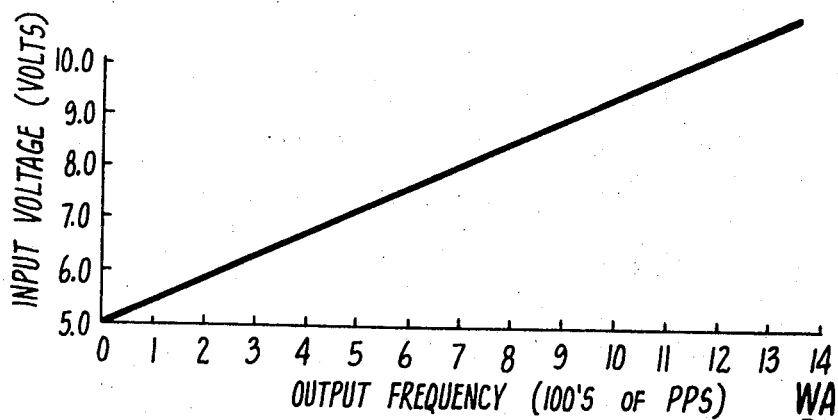
FIG. 3 is a graph showing the relationship between input voltage and the output frequency.

FIG. 3 shows the linear relationship between input voltage in volts and the output frequency in hundreds of pulses per second.

Figure 2:
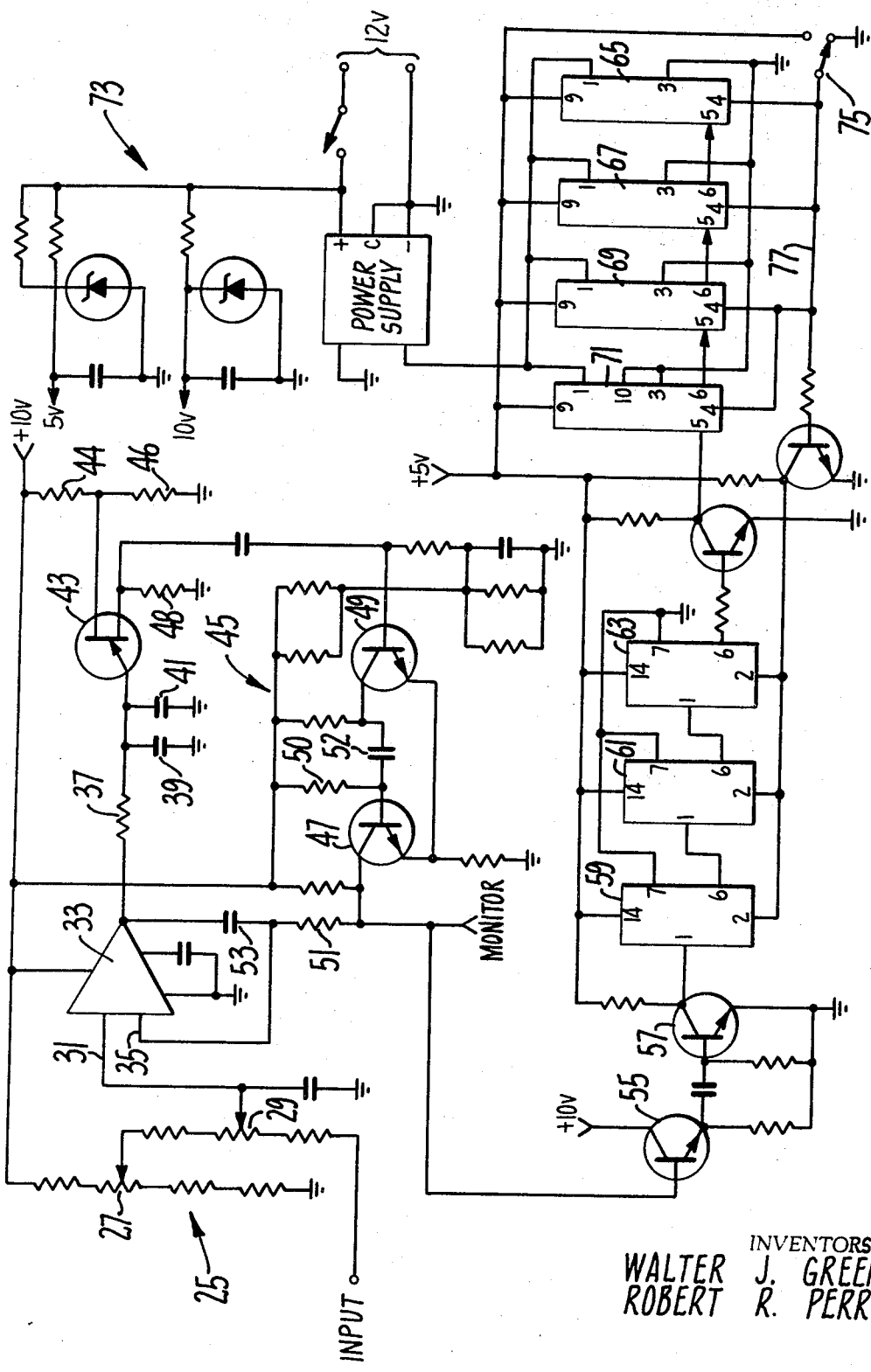
FIG. 2 is a schematic diagram showing the actual circuitry employed in carrying out the invention.

Referring now to the detailed circuit diagram of the distance log as is shown in FIG. 2, the input signal 23 from the speed sensor (not illustrated) is fed in through a voltage divider 25 which includes two variable resistors 27 and 29, to the non-inverting input 31 of operational amplifier 33. The feedback signal from the frequency-to-D.C. voltage converter (described later) is applied to the inverting input 35 of operational amplifier 33. Since the feedback signal is applied to the inverting input, only the difference voltage between the two input signals is amplified by the operational amplifier.

The output of the operational amplifier supplies the voltage to the RC timing network 37, 39, and 41 of unijunction oscillator 43. The frequency of the unijunction oscillator will vary depending on the output voltage of the operational amplifier. The higher the output voltage, the higher the frequency. Thus, the unijunction oscillator 43 serves as the voltage-to-frequency converter. The output from the unijunction oscillator 43 is a narrow positive going spike that is capacitively coupled to a linear frequency-to-voltage converter generally designated 45. This converter is a monostable multivibrator with transistors 47 and 49 followed by an integrator made up of 51 and 53 to provide a D.C. voltage proportional to frequency. The pulses from the unijunction oscillator trigger the multivibrator. For each trigger pulse the multivibrator generates a square shaped pulse of identical amplitude and duration. When these pulses are integrated, a D.C. voltage is obtained at 35 that is proportional to the frequency of the pulses.

The voltage-to-frequency converter and the frequency-to-voltage feedback converter, when connected as a system, provide a linear voltage-to-frequency conversion. The pulse output from this system, both the unijunction pulses or the multivibrator pulses, are now linearly related to the speed sensor input and are amplified to a usable level in transistors 55 and 57. The amplified pulses from the multivibrator 45 are divided in 59, 61, and 63 so that one pulse appears at the output of 63 for every 40960 pulses of the multivibrator. The four decades of the display system display the sum of these pulses. In the first decade 65, each pulse represents .1 nautical mile. After each ten pulses, the first decade generates a carry pulse to the second decade 67 to indicate miles traveled. Each decade generates one carry pulse to the next highest decade for each time it receives 10 input pulses.

The operational amplifier 33 is powered from a single +10V power supply; therefore, its output voltage swing is between ground and +10V. The resistive divider, 44 and 46, determines the voltage level at which the unijunction oscillator 43 will operate. This is set to between 3 and 4 volts and for each time the voltage on 39 and 41 rises to this level, the unijunction transistor will dicharge these capacitors through 48 and generate a positive pulse across the resistor. Wherever the output voltage of 33 is above the unijunction trigger voltage, the oscillator will generate pulses. The higher the voltage, the more rapidly the voltage on 39 and 41 will rise to the trigger level and the more rapidly the pulses will be generated. The operating range of the unijunction oscillator is from zero pulses for voltages below its trigger level to about 1400 pulses per second for 10 volts output from 33.

When the speed sensor input voltage is at 5V, representing zero speed, the output voltage of 35 must be just below the trigger level of the unijunction oscillator so that no pulses are generated. For this condition the quiescent state of the multivibrator 45 has an output voltage of about 5 volts. This is the case when 47 is conducting and 49 is off. The output of the multivibrator is connected to the inverting input 35 of amplifier 33 through a 100K ohm resistor 51. Since there is little current flow through this resistor, the voltage at 35 (inverting input) is approximately the same as the input signal representing zero speed. The two inputs at 31 and 35 to 33 must be equal at zero speed. The zero speed calibration adjustment 27, provides a fine balance control to make these two voltages equal.

As the input voltage from the speed sensor rises, there will be a differential of voltage at the 31 input. This difference is amplified and the output of 35 will rise above the trigger level of the unijunction oscillator. Pulses will be generated and the multivibrator will operate. There will be square pulses at the output of the multivibrator. The baseline of the pulses will be at the quiescent voltage of the multivibrator and the top of the pulses will be at +10V. This is the condition when 47 is off and 49 is conducting. The duration of each pulse is identical and is determined principally by the RC time constant of resistor 50 and 52. The square pulses from the multivibrator are integrated by 51 and 33 and its feedback capacitor 53. The integrated value will be some voltage above the quiescent output voltage of the multivibrator, hence the voltage at the inverting input 35 of 33 has risen to partially cancel the effect of the rising input voltage from the speed sensor. This is the negative feedback voltage that serves to linearize the output of the voltage-to-frequency converter. FIG. 3 is a plot of frequency vs. input voltage and shows the linear relationship between the two parameters. The slope of the line indicates the conversion sensitivity in cycles per second per volt of input. The top speed calibration adjustment 29, serves to vary the conversion sensitivity so that the pulse count at the input to the first decade of display equals one pulse per nautical mile. This adjustment is set with a 10V input from the speed sensor and should be adjusted to give an oscillator pulse rate of 1364 pulses per second. Since there is some interdependency between the zero speed and the top speed calibration, these adjustments must be made at least three times to obtain an accurate calibration of the distance log.

A voltage regulated power supply 73 of conventional design supplies 5 and 10V outputs and is connected as shown. Switch 75, which is preferably of the momentary contact type, is employed to disconnect the negative bus 77 leading to the decade counters from ground to reset the counters to 0 when this is desired.

In one practical embodiment of the invention, amplifier 33 was an LM301A while dividers 59, 61, and 63 were MC839P. The unijunction transistor 43 was a GE–D13T1. Resistor 37 and capacitors 39 and 41, which set the unijunction time constant were 158K ohms, 0.01 and 0.0062 mfd respectively. The multivibrator time constant is set by 50 and 52 which had values of 100K ohms and 0.0062 mfd. The counter and display devices 65, 67, 69, and 71 were CS103-4.

Although certain specific values of components, repetition rates and voltages and the like have been given, it will be understood that these are only for purposes of illustration and that many other components and values might be used without departing from the spirit of this invention.

Although an electronic readout and decade counter is described, it is obvious that the readout could be by mechanical means. Thus, the pulses from 63 could be employed to energize a solenoid to actuate a conventional mechanical counter.

We claim:

1. A distance log for boats or the like wherein a speed sensor having a D.C. voltage output proportional to speed is provided comprising in combination means for converting the voltage output of said speed sensor into a series of electrical pulses wherein the frequency of said pulses is proportional to the speed of the vessel and means for counting said pulses and displaying the sum thereof to indicate the distance which the vessel has traveled.

2. The log of claim 1 wherein a feedback circuit is employed to provide a linear conversion from voltage to frequency whereby the output frequency is directly proportional to speed.

3. The log of claim 2 wherein the voltage-to-frequency converter employs a first non-linear voltage-to-frequency converter and a second linear frequency-to-voltage converter and wherein the frequency output of the first converter is fed to the second converter and changed to a D.C. voltage which is fed back to the first converter to almost cancel the effect of voltage input from the speed sensor whereby the D.C. input voltage to the overall converting circuit is converted to an output frequency having a linear relationship to the input voltage.

4. The log of claim 1 wherein a cascade of digital counters is employed to divide the frequency to provides a relatively slow pulse rate and wherein the pulses from said digital counters are fed to a digital display system wherein said pulses are converted to numbers representing nautical miles traveled.

5. The log of claim 1 wherein the voltage sensor has a range from about 5 to about 10 volts representing a pulse train of from 0 to 1,364 pulses per second and wherein said pulses are divided by a factor of 40,960 to provide a series of output pulses wherein one pulse corresponds to 1/10 of a nautical mile.

6. The log of claim 5 wherein said pulse train is fed to four digital display counters wherein said counters display respectively 100 miles, 10 miles, 1 mile and 1/10 mile in a digital readout.

* * * * *